United States Patent
Umemoto et al.

(10) Patent No.: US 7,722,935 B2
(45) Date of Patent: May 25, 2010

(54) RETARDATION FILM, USE OF SAID RETARDATION FILM, AND NOVEL MODIFIED POLYMER

(75) Inventors: Seiji Umemoto, Ibaraki (JP); Yutaka Ohmori, Ibaraki (JP); Michie Sakamoto, Ibaraki (JP); Takashi Kamijou, Ibaraki (JP); Junzou Miyazaki, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 590 days.

(21) Appl. No.: 11/579,921

(22) PCT Filed: Jun. 14, 2005

(86) PCT No.: PCT/JP2005/010858

§ 371 (c)(1),
(2), (4) Date: Nov. 8, 2006

(87) PCT Pub. No.: WO2006/008894

PCT Pub. Date: Jan. 26, 2006

(65) Prior Publication Data

US 2007/0243340 A1     Oct. 18, 2007

(30) Foreign Application Priority Data

Jul. 16, 2004   (JP) .............................. 2004-210549
Jan. 19, 2005   (JP) .............................. 2005-012055

(51) Int. Cl.
    G02F 1/13363   (2006.01)
(52) U.S. Cl. ..................................... 428/1.33; 349/117
(58) Field of Classification Search .................. 428/1.3, 428/1.33, 1.5, 1.54, 1.55; 349/117–118; 430/287, 287.1, 288.1
See application file for complete search history.

(56) References Cited

U.S. PATENT DOCUMENTS 4,152,159 A * 5/1979 Daly et al. ............... 430/285.1

(Continued)

FOREIGN PATENT DOCUMENTS

EP   0181094 B1   5/1986
EP   0482620 A2   4/1992

(Continued)

OTHER PUBLICATIONS

International Search Report of PCT/JP2005/010858, date of mailing: Sep. 27, 2005.
European Search Report dated Feb. 4, 2010, issued in corresponding European Patent Application No. 05751036.

*Primary Examiner*—Sophie Hon
(74) *Attorney, Agent, or Firm*—Westerman, Hattori, Daniels & Adrian, LLP (57) ABSTRACT

A modified polymer which can serve as a raw material of novel reverse dispersion retardation films is provided, the modified polymer having no need to select a plurality of monomers or polymers in order to realize a reverse dispersion and having no problems concerning glass transition temperature or the like in drawing treatment. A polymer having a polyol skeleton as its main chain is caused to react with a compound for modification such as an aromatic carboxylic acid hydride. Through this reaction, a modified polymer in which a chemical group such as an aromatic carbonyl group is bonded to an oxygen atom in a side chain of the polyol skeleton is prepared. For example, polyvinyl alcohols and benzoyl chloride can be used as the polymer and the compound for modification, respectively. The chemical group may be a benzoyl group. When this modified polymer is formed into a film and then subjected to drawing treatment, a retardation film which exhibits a reverse wavelength dispersion characteristic can be obtained.

7 Claims, 3 Drawing Sheets

U.S. PATENT DOCUMENTS

| | | |
|---|---|---|
| 4,880,873 A | 11/1989 | Sagane |
| 5,739,296 A * | 4/1998 | Gvon et al. ............... 534/577 |
| 5,747,121 A * | 5/1998 | Okazaki et al. ........... 428/1.54 |
| 5,830,953 A | 11/1998 | Nishikawa |
| 2008/0200621 A1 * | 8/2008 | Ohmori et al. ............. 525/472 |

FOREIGN PATENT DOCUMENTS

| | | |
|---|---|---|
| EP | 1197768 A1 | 4/2002 |
| GB | 1294962 A | 11/1972 |
| GB | 1584009 A | 2/1981 |
| JP | 51-136781 A | 11/1976 |
| JP | 53-17688 A | 2/1978 |
| JP | 61-87772 A | 5/1986 |
| JP | 61-168603 A | 7/1986 |
| JP | 9-316127 A | 12/1997 |
| JP | 2000-284286 A | 10/2000 |
| JP | 2002-221622 A | 8/2002 |

\* cited by examiner

RETARDATION FILM, USE OF SAID RETARDATION FILM, AND NOVEL MODIFIED POLYMER

This application is a 371 of PCT/JP05/10858 filed Jun. 14, 2005.

TECHNICAL FIELD

The present invention relates to a retardation film, and a liquid crystal panel, a liquid crystal display device and an image display device each having the retardation film. The present invention relates to novel modified polymer, and particularly to a novel modified polymer which is to be used as a raw material of retardation films.

BACKGROUND ART

In image display devices such as liquid crystal display devices, retardation films are usually widely used for improving viewing angle characteristics of display screens.

Although $\lambda/2$ plates and $\lambda/4$ plates are known as the aforesaid retardation films, many of them have a characteristic that absorption is greater on a short wavelength side and the retardation increases as the wavelength becomes shorter. Such a characteristic is generally called a positive wavelength dispersion characteristic (henceforth referred to as "positive dispersion"). However, retardation films which exhibit positive dispersion have some problems such as those shown below.

The retardation of a retardation film usually is adjusted to ½ of a wavelength in a case of a $\lambda/2$ plate and to ¼ of a wavelength in a case of a $\lambda/4$ plate. Ideally, a characteristic curve of the retardation film with wavelength as an abscissa and retardation as an ordinate is demanded to show a straight line with a shift rising steadily from left to right. This is because if such a characteristic curve is shown, the retardation increases with increase in wavelength and, therefore, retardations near values of ¼ or ½ of a wavelength are obtained for any wavelength. However, a retardation film with a positive dispersion actually shows a curve with a shift rising steadily from right to left, which behaves differently from an ideal straight line, because such a film exhibits a larger retardation as the wavelength becomes shorter as described above. In other words, although a desired retardation is satisfied for some wavelengths, it is impossible to obtain a desired retardation in a wide wavelength band. For this reason, it is difficult for retardation films with a positive dispersion to convert light into linearly polarized light over a wide wavelength band.

For such a reason, retardation films which exhibit wavelength dispersion characteristics different from positive dispersion have recently been attracting attentions. They are retardation films which exhibit characteristics such that the retardation increases as the wavelength becomes longer, namely, wavelength dispersion characteristics with reverse dispersion (henceforth, referred to as "reverse dispersion"). In such retardation films, the retardation becomes larger as the wavelength becomes longer. Therefore, the aforesaid characteristic curve of the retardation shows a curve with a shift rising steadily from left to right and approximates an ideal behavior. In other words, in the case of a $\lambda/4$ plate for example, a retardation near a value of ¼ of a wavelength is obtained in a wide wavelength band. Therefore, it becomes possible to convert light into polarized light as a $\lambda/4$ plate in a wide wavelength band. In a case of a retardation film which exhibits a larger reverse dispersion, it can be used in a wide wavelength band as a $\lambda/2$ plate whose ideal retardation is a value of ½ of a wavelength. Regarding the "amplitude of reverse dispersion", in the aforesaid characteristic curve for example, the relatively greater the slope, the larger the reverse dispersion; whereas the relatively smaller the slope, the smaller the reverse dispersion. Therefore, in the case of a $\lambda/2$ plate, what is required is that the slope of the aforesaid characteristic curve is larger (a larger retardation is shown for every wavelength), in other words, there is a large reverse dispersion, in comparison to a $\lambda/4$ plate, because ½ of a wavelength is the ideal retardation of the $\lambda/2$ plate.

The reverse dispersion characteristics mentioned above usually depend upon a kind of the polymer used as a raw material of the retardation film. However, there are very few reports about polymer which can realize reverse dispersion.

Specifically, for example, a method has been reported in which a retardation film with a reverse dispersion is formed by forming a film from a polymer resulting from polymerization of two kinds of monomers and drawing the film, thereby causing the film to express retardation (JP-A 2002-221622). The two kinds of monomers in this method are of a combination in which one shows a positive birefringent property (monomer 1) and another shows a negative birefringent property (monomer 2), wherein the wavelength dispersion characteristics of both monomers satisfy monomer 1<monomer 2. On the other hand, a method has been reported in which a retardation film with a reverse dispersion is formed by blending two kinds of polymers differing in retardation polarity and wavelength dispersion characteristics (JP-A 2002-14234). Further, a method for producing a retardation film with a reverse dispersion from a mixture of a liquid crystal molecule and a polymer has also been reported (JP-A 2002-48919).

However, a polycarbonate having a fluorene skeleton disclosed in the above-cited JP-A 2002-221622 has a very high glass transition point due to its structure. Therefore, there is a problem that the drawing temperature must be set at a very high temperature in a drawing treatment for expressing retardation. In addition, when such an undrawn film of polycarbonate is subjected to shrinking treatment in order to increase a refractive index in a thickness direction, there also arises a problem described below. The shrinking treatment is a method in which an undrawn film is stuck to a film capable of shrinking on heating and the resulting laminate is heated and drawn (JP-A 5-157911). In this case, it is difficult to produce a retardation film with a high refractive index in the thickness direction in an industrial scale because the drawing temperature of the undrawn film of polycarbonate is too high in comparison to the shrinking temperature of the shrinking film.

The method disclosed in JP-A 2002-14234 has a problem that when dissolving two kinds of polymers together it is difficult to maintain transparency of a resulting blend polymer and alternatives of the combination of the polymers are limited. Moreover, also in the method disclosed in JP-A 2002-48919, it is difficult to choose a combination of a polymer and a liquid crystal molecule which are compatible with each other. For example, in some combinations, liquid crystal molecules dispersed in a polymer change into liquid during the heating and drawing treatment of a film. This may cause the resulting retardation film to have a high haze, which may result in reduction in transparency.

DISCLOSURE OF THE INVENTION

Under such circumstances, the present invention intends to provide a retardation film which require no choice of a plurality of monomers or polymers for realizing reverse dispersion and being able to avoid problems regarding the drawing temperature which depends upon the types of polymers, use of said retardation film, and a novel modified polymer.

In order to attain the object, a retardation film of the present invention consists of a film comprising a modified polymer having, as a main chain, a polyol skeleton having a side chain with a portion which has been modified with a chemical group, the chemical group being at least one group selected from a group consisting of an aromatic carbonyl group, an aryl-substituted lower alkylcarbonyl group and an unsaturated aliphatic carbonyl group, and the chemical group being bonded to an oxygen atom in the polyol skeleton side chain.

The modified polymer of the present invention shows a small wavelength dispersion but expresses a large retardation due to its polyol skeleton as a main chain. The modified polymer is imparted further with reverse dispersion by bonding of the aforesaid chemical group to an oxygen atom in the aforesaid polyol skeleton side chain. For this reason, a retardation film consisting of a film comprising a modified polymer is obtained which exhibits reverse dispersion and which can realize a large retardation. The fact that it is possible to realize both a reverse dispersion and a large retardation by a polyol skeleton and bonding of the aforesaid chemical group to a side chain of the polyol skeleton is a finding found first by the present inventors.

BEST MODE FOR CARRYING OUT THE INVENTION

The modified polymer using retardation film in the present invention is a polymer which has, as its main chain, a polyol skeleton having a side chain substituted with at least one chemical group selected from the group consisting of an aromatic carbonyl group, an aryl-substituted lower alkylcarbonyl group, and an unsaturated aliphatic carbonyl group provided that the chemical group is bonded to an oxygen atom in the polyol skeleton side chain. As will be described later, it is unnecessary that all oxygen atoms in the side chain of the polyol skeleton are modified with the chemical group(s). Thus, it is sufficient that the polymer is a polymer having a side chain wherein oxygen atom(s) are partially modified with the chemical group(s). Accordingly, the modified polymer is a polymer having a moiety where a side chain of its polyol skeleton is/are modified with the chemical group(s).

The modified polymer shows a small wavelength dispersion but expresses a large retardation due to its polyol skeleton as a main chain. The modified polymer is imparted further with reverse dispersion by bonding of the aforesaid chemical group to an oxygen atom in the aforesaid polyol skeleton side chain. For this reason, when the modified polymer of the present invention is used, a retardation film is obtained which exhibits reverse dispersion and which can realize a large retardation.

Further, it is also possible, for example, to change the amplitude of wavelength dispersion or to express a large retardation while maintaining transparency by changing the modification ratio of the chemical group to the polyol skeleton. Therefore, in the preparation of a retardation film, it is possible to adjust the retardation only by changing the thickness of the film or conditions for drawing treatment, more easily than by conventional methods. Further, the modified polymer can avoid the aforementioned drawing temperature problem in the preparation of the retardation film because in the modified polymer, unlike polycarbonate having a fluorene skeleton, the main chain is a polyol skeleton and the glass transition temperature is controlled. The modified polymer which exhibits reverse dispersion and which can express a large retardation is obtained easily by the following production process. Therefore, the production itself of a reverse dispersion retardation film becomes simple and convenient.

Examples of the polyol skeleton include a polyvinyl alcohol (PVA) skeleton, and a polyethylene vinyl alcohol (EVOH) skeleton. The PVA skeleton is preferred. Besides the aforementioned chemical group(s), a lower alkylcarbonyl group may be bonded partially to the oxygen atoms in the side chain of the polyol skeleton. This lower alkylcarbonyl group is, for example, an acetyl group ($CH_3 \leqq CO-$).

The aromatic carbonyl group which is one of the chemical groups is represented by, for example, the following formula (1) or (2):

(1)

wherein $R^1$, $R^2$, $R^3$, $R^4$ and $R^5$ may be the same or different and each represent a hydrogen atom or halogen atom, or a hydroxyl, methyl, ethyl, halogenated methyl, halogenated ethyl or nitro ($-NO_2$) group, or

(2)

wherein $R^6$, $R^7$, $R^8$, $R^9$, $R^{10}$, $R^{11}$ and $R^{12}$ may be the same or different and each represent a hydrogen atom or halogen atom, or a hydroxyl, methyl, ethyl, halogenated methyl, halogenated ethyl or nitro ($-NO_2$) group.

The aromatic carbonyl group represented by the formula (1) is preferably, for example, a benzoyl group ($C_6H_5-CO-$), which is a group wherein $R^1$ to $R^5$ are each a hydrogen atom.

The aryl-substituted lower alkylcarbonyl group is represented by, for example, $Ar-(CH_2)_n-CO-$ wherein Ar is an aromatic ring and n is an integer of 1 to 2, preferably n is 1 (an aryl-substituted methylcarbonyl group: $Ar-CH_2-CO-$).

The aryl-substituted lower alkylcarbonyl group can be specifically represented by the following formula (3) or (4):

(3)

wherein $R^1$, $R^2$, $R^3$, $R^4$ and $R^5$ may be the same or different and each represent a hydrogen atom or halogen atom, or a hydroxyl, methyl, ethyl, halogenated methyl, halogenated ethyl or nitro (—$NO_2$) group, and n is an integer of 1 to 2, preferably n is 1 (an aryl-substituted methylcarbonyl group), or (4)

wherein $R^6$, $R^7$, $R^8$, $R^9$, $R^{10}$, $R^{11}$ and $R^{12}$ may be the same or different and each represent a hydrogen atom or halogen atom, or a hydroxyl, methyl, ethyl, halogenated methyl, halogenated ethyl or nitro (—$NO_2$) group, and n is an integer of 1 to 2, preferably n is 1 (an aryl-substituted methylcarbonyl group).

It is preferable that at least one of an aromatic carbonyl group and an aryl-substituted lower alkylcarbonyl group be included as the chemical group. The aryl-substituted lower alkylcarbonyl group is preferably an aryl-substituted methylcarbonyl group (Ar—$CH_2$—CO—), wherein n is 1 in each of the aforementioned formulae. When the chemical group is an aromatic carbonyl group or an aryl-substituted methylcarbonyl group as mentioned above, the number of carbon atoms between the main chain and the aromatic ring of the chemical group is 1 or 2. When the carbon atom number is 1 or 2, for example, the modified polymer is used to form a film, whereby the obtained film can be a very rigid film. Moreover, the freedom degree of the side chain of the polymer is more restricted, and thus reverse dispersion is more easily realized. This would be based on the following reason. When a film is drawn, the main chain of the polymer is usually oriented in the direction of the draw. Accordingly, its side chain is also oriented in the same direction. However, when a polymer has an aromatic ring as described above and further the number of carbon atoms as described above is set to one or two, the freedom degree of its side chain can be further limited. For this reason, the orientation of the side chain in the draw direction is sufficiently restrained in the same manner as that of the main chain, so that the side chain can easily be oriented perpendicularly to the main chain. As a result, the property of reverse dispersion imparted by the chemical group(s) bonded appears to be exhibited sufficiently.

The unsaturated aliphatic carbonyl group is preferably, for example, a group having at least one of a double bond and a triplet bond. Specific examples thereof include a group represented by any one of the following formulae (5) to (7):

(5)

(6)

(7)

wherein $R^{13}$, $R^{14}$ and $R^{15}$ are each a hydrogen atom or halogen atom, or a hydroxyl, methyl, ethyl, halogenated methyl, halogenated ethyl or nitro (—$NO_2$) group.

Of the unsaturated aliphatic carbonyl groups, the chemical group represented by the formula (5) is preferred, and a propioloyl group (CH≡C—CO—), wherein $R^{13}$ is a hydrogen atom in the formula (5), is preferred.

The modification ratio of the polyol skeleton based on the aforementioned chemical group is preferably in the range of 1 to 20% of the number of all carbon atoms in the main chain of the polyol skeleton, more preferably in the range of 4 to 20% thereof, even more preferably in the range of 4 to 15% thereof.

Unlike the aforesaid polycarbonates with fluorene skeletons, since the modified polymer of the present invention has a polyolefin skeleton, the glass transition temperature thereof is usually in the range of 80 to 180° C.

Next, the process for producing the modified polymer of the present invention is described. As mentioned previously, the process for producing the modified polymer of the present invention comprises a step of causing a polymer having a polyol skeleton as its main chain (hereinafter, referred also to as "starting polymer") to react with at least one compound for modification selected from a group consisting of an aromatic carboxylic acid, an aromatic carboxylic acid halide, an aromatic carboxylic acid anhydride, an aryl-substituted lower alkylcarboxylic acid, an aryl-substituted lower alkylcarboxylic acid halide, an aryl-substituted lower alkylcarboxylic acid anhydride, an aromatic ketone, an aromatic aldehyde, an unsaturated aliphatic carboxylic acid, an unsaturated aliphatic carboxylic acid halide, an unsaturated aliphatic carboxylic acid anhydride, an unsaturated aliphatic ketone, and an unsaturated aliphatic aldehyde. According to this production process, for example, between a hydroxyl group of the starting polymer and a functional group (such as a carboxyl, halogenated carbonyl or carbonyl group) of the compound for modification, a reaction (such as dehydration or dehydrogenhalogenation) occurs. By this reaction, a bond (such as an ester bond) is formed between the aforementioned chemical group and the oxygen atom in the side chain of the starting polymer, so as to yield the modified polymer of the present invention. The process for producing the modified polymer of the present invention is not restricted to the above-mentioned one.

The aromatic carboxylic acid is represented by, for example, RCOOH. The aromatic carboxylic acid halide is represented by, for example, RCOZ. The aromatic carboxylic acid anhydride is represented by, for example, $(RCO)_2O$. In each of the formulae, R is represented by the following general formula (8) or (9), and Z is a halogen atom:

(8)

wherein $R^1$, $R^2$, $R^3$, $R^4$ and $R^5$ may be the same or different and each represent a hydrogen atom or halogen atom, or a hydroxyl, methyl, ethyl, halogenated methyl, halogenated ethyl or nitro ($-NO_2$) group, or

(9)

wherein $R^6$, $R^7$, $R^8$, $R^9$, $R^{10}$, $R^{11}$ and $R^{12}$ may be the same or different and each represent a hydrogen atom or halogen atom, or a hydroxyl, methyl, ethyl, halogenated methyl, halogenated ethyl or nitro ($-NO_2$) group.

Of the aforementioned modifying compounds, preferred is the aromatic carboxylic acid halide RCOZ. Particularly preferred is benzoyl chloride ($C_6H_5COCl$), wherein R is represented by the formula (8), $R^1$ to $R^5$ in the formula (8) are each a hydrogen atom and Z is chlorine (Cl).

The aryl-substituted lower alkylcarboxylic acid is represented by, for example, $Ar-(CH_2)_n-COOH$. The aryl-substituted lower alkylcarboxylic acid halide is represented by, for example, $Ar-(CH_2)_n-COZ$. The aryl-substituted lower alkylcarboxylic acid anhydride is represented by, for example, $(Ar-(CH_2)_n-CO)_2O$. In each of the formulae, Ar is an aromatic ring, Z is a halogen atom, and n is an integer of 1 to 2, preferably 1 (an aryl-substituted methylcarboxylic acid, an aryl-substituted methylcarboxylic acid halide, or an aryl-substituted methylcarboxylic acid anhydride).

Specifically, the aryl-substituted lower alkylcarboxylic acid is represented by, for example, R'COOH. The aryl-substituted lower alkylcarboxylic acid halide, is represented by, for example, R'COZ. The aryl-substituted lower alkylcarboxylic acid anhydride is represented by, for example, $(R'CO)_2O$. In each of the formulae, R' is represented by the following formula (10) or (11), and Z is a halogen atom:

(10)

wherein $R^1$, $R^2$, $R^3$, $R^4$ and $R^5$ may be the same or different and each represent a hydrogen atom or halogen atom, or a hydroxyl, methyl, ethyl, halogenated methyl, halogenated ethyl or nitro ($-NO_2$) group, and n is an integer of 1 to 2, preferably 1, or (11)

wherein $R^6$, $R^7$, $R^8$, $R^9$, $R^{10}$, $R^{11}$ and $R^{12}$ may be the same or different and each represent a hydrogen atom or halogen atom, or a hydroxyl, methyl, ethyl, halogenated methyl, halogenated ethyl or nitro ($-NO_2$) group, and n is an integer of 1 to 2, preferably 1.

Preferred examples of the modifying compound include the aforementioned aromatic carboxylic acid, aromatic carboxylic acid halide, aromatic carboxylic acid anhydride, aryl-substituted lower alkylcarboxylic acid, aryl-substituted lower alkylcarboxylic acid halide, aryl-substituted lower alkylcarboxylic acid anhydride. The aryl-substituted lower alkylcarboxylic acid, the aryl-substituted lower alkylcarboxylic acid halide, and the aryl-substituted lower alkylcarboxylic acid anhydride are preferably an aryl-substituted methylcarboxylic acid, an aryl-substituted methylcarboxylic acid halide, and an aryl-substituted methylcarboxylic acid anhydride, wherein n is 1 in each of the aforementioned formulae, respectively. When any one of these modifying compounds is used to produce a modified polymer, in the polymer the number of carbon atoms between its main chain and the aromatic ring in the chemical group becomes 1 or 2. Accordingly, advantageous effects as described above can be obtained.

It is preferred that the unsaturated aliphatic carboxylic acid, the unsaturated aliphatic carboxylic acid halide and the unsaturated aliphatic carboxylic acid anhydride each have at least one of a double bond and a triple bond. The unsaturated aliphatic carboxylic acid is represented by, for example, R"COOH. The unsaturated aliphatic carboxylic acid halide is represented by, for example, R"COZ. The unsaturated aliphatic carboxylic acid anhydride is represented by, for example, $(R"CO)_2O$. In each of the formulae, R" is represented by any one of the following formulae (12) to (14), and Z is a halogen atom:

wherein $R^{12}$, $R^{13}$ and $R^{14}$ are each a hydrogen atom or halogen atom, or a hydroxyl, methyl, ethyl, halogenated methyl, halogenated ethyl or nitro (—$NO_2$) group.

Of the unsaturated aliphatic carboxylic acid, the unsaturated aliphatic carboxylic acid halide and the unsaturated aliphatic carboxylic acid anhydride, preferred is the unsaturated aliphatic carboxylic acid represented by R"COOH. Particularly preferred is propiolic acid (HC≡C—COOH), wherein R" is represented by the formula (12) and $R^{13}$ is hydrogen.

Examples of the polymer having a polyol skeleton (starting polymer) include polyvinyl alcohol (PVA) and polyethylene vinyl alcohol (EVOH). PVA is preferred. Usually, PVA is produced by saponifying polyvinyl acetate, and EVOH is produced by saponifying ethylene-vinyl acetate copolymer (EVA). The saponification degree thereof is not particularly limited, and is, for example, in the range of 40 to 100%, preferably in the range of 60 to 100%, more preferably in the range of 80 to 100%. The degree of modification ratio with the chemical group can be controlled by the saponification degree of PVA or EVOH. This control will be described later.

Since the saponification degree of the starting polymer is not particularly limited, the starting polymer may be a polymer wherein lower alkylcarbonyl groups such as acetyl groups ($CH_3$—CO—) are bonded to some ones out of oxygen atoms in the side chain(s) of a polyol skeleton.

Regarding each of the compound for modification and the starting polymer, a single kind thereof may be used or two or more kinds thereof may be used.

In the present invention, the introduction ratio of the compound for modification into the polyol skeleton of the starting polymer (the modification ratio with the chemical group) is adjusted preferably into the range of 1 to 20% of the number of all carbon atoms in the main chain, more preferably into the range of 4 to 20% thereof, even more preferably into the range of 4 to 15% thereof. The method of the adjustment will be described later.

The process for producing the modified polymer of the present invention is exemplified by, but is not restricted to, one shown below.

First, a starting polymer is dissolved in a solvent to prepare a polymer solution. The kind of the solvent may be determined appropriately in accordance with the kind of the starting polymer. Examples of the solvent include pyridine, chlorine-containing solvents such as methylene chloride, trichloroethylene, and tetrachloroethane, ketone solvents such as acetone, methyl ethyl ketone (MEK), and cyclohexane, aromatic solvents such as toluene, cyclic alkanes such as cycloheptane, amide solvents such as N-methylpyrrolidone, and ether solvents such as tetrahydrofuran. These may be used alone or in combination of two or more thereof.

The dissolution of the starting polymer is preferably attained under a drying condition. For example, the starting polymer itself may be dried in advance.

The modifying compound is further added to the polymer solution to cause the starting polymer and the modifying compound to react with each other. By adjusting the amount of the added modifying compound, the introduction ratio of the modifying compound into the starting polymer (modification rate based on the chemical group) can be controlled. This control will be described later.

The reaction is preferably conducted under a heating condition. The reaction temperature is not particularly limited, and is usually in the range of 25 to 60° C. The reaction time is usually in the range of 2 to 8 hours. If the reaction temperature is lower than the aforementioned temperature for the dissolving treatment of the starting polymer, for example, it is preferred to lower the temperature of the polymer solution once to the reaction temperature and then add thereto the modifying compound. It is also preferred to conduct the reaction while stirring the reaction solution containing the starting polymer and the modifying compound.

The reaction may be conducted in the presence of a catalyst. A catalyst known in the conventional art, for example, p-toluenesulfonic acid monohydride or some other acid catalyst can be used.

From this reaction solution, a modified polymer, which is a reaction product, is collected. The collection of the modified polymer can be performed, for example, as follows.

First, a solvent such as acetone is added to the reaction solution, and a filtrate is collected. Water is added to this filtrate to precipitate the modified polymer. The precipitation is separated by filtration, whereby the modified polymer can be collected. The collected precipitation is usually white. Preferably, the collected modified polymer is further stirred in water so as to be washed. After the washing, the collected modified polymer is dried under a reduced pressure, whereby the modified polymer in a dry state can be obtained.

The introduction ratio of the modifying compound into the starting polymer (the modification ratio based on the chemical group) can be controlled, for example, as follows.

A first method for the control is a method of selecting the starting polymer having an appropriate saponification degree. Specifically, when conditions for the reaction, such as the addition ratio between the starting polymer and the modifying compound and the temperature therefor, are the same, for example, the introduction ratio of the modifying compound (the modification ratio) can be made high by using the starting polymer having a relatively high saponification degree, and the introduction ratio of the modifying compound (the modification ratio) can be made low by using the starting polymer having a relatively low saponification degree.

A second method for the control is a method of adjusting the addition ratio between the starting polymer and the modifying compound. Specifically, the introduction ratio (modification ratio) can be made high by making the addition ratio of the modifying compound to the starting polymer relatively high, and the introduction ratio (modification ratio) can be made low by making the addition ratio of the modifying compound to the starting polymer relatively low.

A third method for the control is a method of causing the starting polymer to react with the modifying compound to bond the chemical group therefrom to the starting polymer and then subjecting the resultant to hydrolysis or some other treatment, thereby removing the bonded chemical group.

By a method as described above, the modified polymer can be produced. The modification ratio based on the chemical group in the modified polymer can be detected by, for example, $^1$H-NMR.

Next, the film of the present invention is described. The film of the present invention is a film including the modified polymer of the present invention and it is useful, for example, as a base film of a retardation film which exhibits reverse dispersion.

The process for producing the film is not particularly limited, and examples thereof include film-forming methods known in the conventional art. For example, the film can be produced by extending (applying) a solution of the polymer or a melted solution of the polymer onto a substrate, and solidifying the applied film. The modified polymer of the present invention may be used alone or in combination of two or more thereof. Modified polymers having different modification ratios, modified polymers having different chemical groups, or modified polymers obtained from different starting polymers can be used in the form of a mixture thereof.

The solution of the polymer can be prepared, for example, by dissolving the modified polymer(s) into a solvent. Examples of the solvent include dimethylsulfoxide (DMSO); halogenated hydrocarbons such as chloroform, dichloromethane, carbon tetrachloride, dichloroethane, tetrachloroethane, trichloroethylene, tetrachloroethylene, chlorobenzene, and o-dichlorobenzene; phenols such as phenol and p-chlorophenol; aromatic hydrocarbons such as benzene, toluene, xylene, methoxybenzene, and 1,2-dimethoxybenzene; ketone solvents such as acetone, methyl ethyl ketone, methyl isobutyl ketone, cyclohexanone, cyclopentanone, 2-pyrrolidone, N-methyl-2-pyrrolidone; ester solvents such as ethyl acetate, and butyl acetate; alcohol solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide solvents such as dimethylformamide, dimethylacetoamide; nitrile solvents such as acetonitrile and butyronitrile; ether solvents such as diethyl ether, dibutyl ether and tetrahydrofuran; carbon disulfide; ethylcellosolve; and butylcellosolve. These solvents may be used alone or in combination of two or more thereof.

The addition ratio of the polymer is not particularly limited and, for example, the amount of the polymer is preferably in the range of 5 to 50 parts by weight for 100 parts by weight of the solvent, more preferably in the range of 10 to 40 parts by weight therefor. If necessary, various additives may be added to the polymer solution, examples of the additives including a stabilizer, a plasticizer, and a metal. A different polymer may be added to the polymer solution as long as the reverse wavelength dispersion property of the resultant film is not affected.

The method for the development of the polymer solution is not particularly limited, and a method known in the conventional art can be adopted, examples of the method including spin coating, roll coating, flow coating, printing, dip coating, casting film-forming, bar coating, gravure printing, die coating, curtain coating methods. The solidification of the applied film can be performed by, for instance, natural drying or drying. Conditions therefor are not particularly limited, either. The temperature is usually from 40 to 300° C., preferably from 50 to 250° C., more preferably from 60 to 200° C. The drying of the applied film may be performed at a constant temperature, or may be performed while the temperature is stepwise raised or lowered. The time for the drying is not particularly limited, either, and is usually from 10 seconds to 30 minutes, preferably from 30 seconds to 25 minutes, more preferably from 1 to 20 minutes.

Besides, examples of the process for producing the film of the present invention further include a method in which the modified polymer is melted on heating at a temperature not lower than the melting temperature thereof, followed by forming a film, and extrusion through a nozzle.

The film of the present invention is useful as a forming material of a retardation film. It, therefore, is preferably designed to have a size suitable for the preparation of retardation films mentioned later. Generally, the material of a retardation film preferably has a thickness of from 5 to 500 µm, more preferably from 20 to 300 µm, and particularly preferably from 50 to 200 µm.

Next, the optical film of the present invention is characterized by including a retardation film comprising the modified polymer of the present invention (henceforth referred to as "retardation film of the present invention"). The retardation film exhibits reverse dispersion without performing complicated control needed in the use of conventional polymers and can express a large retardation easily because it includes the modified polymer of the present invention.

The optical film of the present invention is not particularly restricted with respect to its structure as long as it includes the retardation film of the present invention as mentioned above. Therefore, it may be of a structure composed only of the retardation film of the present invention, or alternatively, it may be of a structure composed of a combination of the retardation film and an optical members, such as a polarizer mentioned later.

The process for producing the retardation film of the present invention is not particularly restricted, and methods may be used which are different from conventionally known methods in use of the modified polymer of the present invention is used. Use of the aforesaid film of the present invention is preferred. Specifically, a film of the present invention is subjected, for example, to drawing treatment or shrinking treatment, whereby a retardation is expressed therein. In this way, a retardation film is obtained.

Regarding the drawing treatment, the kind of the drawing (for example, uniaxial drawing or biaxial drawing) or conditions therefor such as the draw ratio may be decided appropriately in accordance with a desired retardation. It is also allowable to stick in advance a shrinkable film which is shrinkable near the drawing temperature onto a film of the present invention and then subject the films together to uniaxial drawing (JP-A 5-157911). This method can easily yield, for example, a retardation film wherein its refractive index in the thickness direction is larger than the in-plane refractive index and the Nz, mentioned later, is less than 1.

The drawing of the film is conducted preferably at a temperature higher than the glass transition temperature of the modified polymer of the present invention. In general, the temperature for the drawing is preferably a temperature 5 to 50° C. higher than the glass transition temperature, and more preferably a temperature 10 to 40° C. higher than the glass transition temperature.

In a retardation film of the present invention, the in-plane retardation at a wavelength of 450 nm, $\Delta nd(450\ nm)$, and the in-plane retardation at a wavelength of 550 nm, $\Delta nd(550\ nm)$, satisfy a relationship provided below. This relationship means to be reverse dispersion where the in-plane retardation $\Delta nd(X\ nm)$ at a wavelength (X nm) tends to increase as the wavelength becomes longer. The wavelength (X nm) is generally in the range of 400 to 700 nm.

$$\Delta nd(450\ nm)/\Delta nd(550\ nm)<1$$

$\Delta nd$ is represented by $(nx \cdot ny) \cdot d$, wherein nx and ny represent a refractive index in the X axis direction and that in the Y axis direction of the retardation film, respectively, wherein the X axis direction is the direction of an axis along which the maximum refractive index is shown in the plane of the retardation film, and the Y axis direction is the direction of an axis perpendicular to the X axis in the plane, and d represents the thickness of the retardation film.

The $\Delta nd(450\,nm)/\Delta nd(550\,nm)$ is more preferably in the range $0.6 \leq \Delta nd(450\,nm)/\Delta nd(550\,nm) < 1$, and particularly preferably in the range of $0.7 \leq \Delta nd(450\,nm)/\Delta nd(550\,nm) \leq 0.9$.

In a retardation film of the present invention, the in-plane retardation at a wavelength of 650 nm, $\Delta nd$ (650 nm) and that at a wavelength of 550 nm, $\Delta nd$ (550 nm) preferably satisfy $1 < \Delta nd$ (650 nm)/$\Delta nd$ (550 nm), more preferably satisfy $1 < \Delta nd$ (650 nm)/$\Delta nd$ (550 nm) $\leq 2$, and even more preferably satisfy $1.1 \leq \Delta nd$ (650 nm)/$\Delta nd$ (550 nm) $\leq 1.3$.

The amplitude of the reverse dispersion of retardation films can be varied by controlling, for example, the modification ratio with chemical groups in the modified polymer of the present invention. Besides, it is also possible to achieve a desired reverse dispersion with a varied wavelength dispersion property by preparing several modified polymers having different modification ratios and mixing them at a predetermined ratio. When modified polymers are mixed in this way, it is preferable that the modification ratio of the whole mixture be, for example, from 1 to 20% of the number of all carbon atoms in the main chains.

The retardation film of the present invention is only required to expresses an in-plane retardation and further exhibit reverse dispersion. The film preferably exhibits, for example, optical properties such as an optical uniaxial property "nx>ny=nz" and optical biaxial properties "nx>ny>nz", "nx>nz>ny". Such an optical property as optical uniaxial property or optical biaxial property can be set by a method known in the conventional art, for example, a method of adjusting the kind of the drawing treatment or conditions therefor. Similarly, the in-plane retardation or the thickness-direction retardation at a given wavelength can also be set by a conventionally known method in which the kind and conditions of the drawing treatment, the thickness of the film used, etc. are appropriately set.

A retardation film in the present invention preferably has an in-plane retardation $\Delta nd$ (550 nm) of from 10 to 1000 nm. In particular, when the retardation film is used as a λ/4 plate, the $\Delta nd$(550 nm) is preferably in the range of 100 to 170 nm, whereas when the retardation film is used as a λ/2 plate, the $\Delta nd$(550 nm) is preferably in the range of 200 to 340 nm.

In the retardation film of the present invention, the Nz coefficient thereof, which is represented by the following equation showing a relationship between the thickness direction birefringence index (nx−nz) and the in-plane birefringence index (nx−ny): Nz=(nx−nz)/(nx−ny), preferably satisfies, for example, the following expression: 0<Nz<1. When one out of retardation films of the present invention is used in a liquid crystal cell, the Nz preferably satisfies: 0.3<Nz<0.7. When two out of retardation films of the present invention are used, it is preferred to set the Nz of one thereof to satisfy 0.3<Nz<0.7, set the Nz of the other to satisfy 0.1<Nz<0.4, and combine the two plates.

In any ordinary retardation film produced by uniaxial drawing (uniaxial retardation film), the Y axis direction refractive index (ny) and the Z axis direction refractive index (nz) are equal to each other. Thus, the Nz coefficient is 1. When this retardation film is inclined to the slow axis thereof, the retardation thereof generally becomes larger as the inclined angle becomes larger. However, in the case that the Nz coefficient of a retardation film satisfies 0<Nz<1 as described above, the retardation change to a change in the inclined angle becomes smaller than in the case of the aforementioned ordinary uniaxial retardation film. In particular, when the Nz is 0.5, the retardation hardly changes if the inclined angle is, for example, about 600. Also, in the case that the retardation film is inclined to the fast axis thereof, the retardation change becomes still smaller as the Nz coefficient is nearer to 0.5. In other words, the rate of the retardation change observed with a change in the inclined angle continuously changes correspondingly to the Nz coefficient. However, the retardation change based on a change in the inclined angle can be sufficiently restrained when the Nz is in particular within a range of 0<Nz<1 as described above.

When an ordinary uniaxial retardation film (Nz=1) is arranged to set the slow axis thereof to 45° to the inclined axis thereof, the axial angle changes in such a manner that the slow axis gets closer to a parallel to the inclined axis as the inclined angle becomes larger. On the other hand, in the retardation film satisfying 0<Nz<1, the amount of change in the axial angle also becomes smaller than in the ordinary uniaxial retardation film. Specifically, in a retardation film having a Nz of 0.5, the axial angle hardly changes from 45°.

The thickness of a retardation film in the present invention is not particularly limited, and is, for example, from 5 to 500 μm, preferably from 10 to 200 μm, more preferably from 20 to 100 μm.

A retardation film in the present invention preferably is, for example, λ/4 plate or λ/2 plate. As mentioned above, the retardation is designed so as to become ¼ wavelength with respect to the desired wavelength when the retardation film is used as a λ/4 plate or so as to become ½ wavelength with respect to the desired wavelength when the film is used as a λ/2 plate. This design can be done by use of a conventionally known method in which the method and conditions for drawing are adjusted as previously mentioned. The retardation film of the present invention can realize a function as a λ/4 plate, a λ/2 plate or the like in a wide wavelength band because it exhibits reverse dispersion and can realize a large retardation.

Next, the optical film of the present invention is explained by taking, as one example, a polarizing plate including a polarizer in addition to the aforesaid retardation film.

For example, the retardation film and the polarizer may be disposed so that the slow axis of the retardation film and the absorption axis of the polarizer are perpendicular, or alternatively, parallel to each other. In particular, when they are arranged so that the axes are parallel to each other, a wide viewing angle broadband polarizing plate is obtained which excels in visual characteristics in a wide wavelength band of visible light.

The polarizer is not particularly restricted, and conventionally known polarizing films may be used. Such a polarizer is usually prepared by causing a polymer film to adsorb a dichromic material such as iodine or a dichromic dye, followed by crosslinking, drawing and drying. Especially, polarizers having excellent light transmittance and polarization degree are preferred. The polymer film is not particularly restricted and examples thereof include hydrophilic polymer films such as PVA-based films, partially-formalized PVA-based films, partially-saponified ethylene-vinyl acetate copolymer-based films and cellulose-based films. Besides, polyene oriented films of dehydrated PVA and dehydrochlorinated polyvinyl chloride can be used as well. Particularly, PVA-based films are preferred. The thickness of the polarizer generally ranges from 1 to 80 μm, though it is not limited to this.

It is preferable that the laminate of a retardation film and a polarizer further have a protective film on its one side or both sides. The protective film is not particularly limited but can be a conventionally known transparent protective film. For example, those excellent in transparency, mechanical strength, thermal stability, moisture shielding property and isotropism are preferred.

Examples of materials for such a protective film include cellulose-based resins such as triacetylcellulose (TAC), and transparent resins based on polyester, polynorbornene, polycarbonate, polyamide, polyimide, polyethersulfone, polysulfone, polystyrene, polyolefin, acrylic substances, acetate and the like. Further, thermosetting resins or ultraviolet-curing resins based on acrylic substances, urethane, acrylic urethane, epoxy, silicones and the like can be used as well. These may be used solely or in combination of two or more sorts of them. Among them, TAC films, especially a TAC film having a surface saponified with alkali or the like, are preferred in view of the polarization property and durability Moreover, a polymer film described in JP-A 2001-343529 (WO 01/37007) also can be used. Examples of polymers which can be used include a resin composition including a thermoplastic resin whose side chain has a substituted or unsubstituted imide group and a thermoplastic resin whose side chain has a substituted or unsubstituted phenyl group and nitrile group. One specific example is a resin composition including an alternating copolymer of isobutene and N-methyl maleimide and an acrylonitrile-styrene copolymer. Alternatively, the polymer film may be formed by extruding the resin composition.

The thickness of the protective film is not particularly limited, but it is typically up to 500 μm, preferably within the range of from 5 to 300 μm, more preferably from 5 to 100 μm, and even more preferably from 5 to 60 μm. The birefringent property of the protective film is not particularly limited. For example, when the film is used in a liquid crystal display device, the birefringent property thereof may be set according to the mode of the device. For example, in the in-plane switching (IPS) mode, a retardation as small as possible is preferred. In the vertically alignment (VA) mode, it is preferable that the retardation in the front be as small as possible. It is also preferable that the retardation in an oblique direction exhibits a negative optical uniaxiality such that the slow axis is expressed horizontally with respect to viewing.

Though a retardation film of the present invention and a polarizer may be laminated together, for example, via a protective film like that mentioned above, they may be stuck directly. This is because the retardation film of the present invention has a polyol skeleton and, therefore, it can be stuck to a polarizer (especially, a polarizer made of PVA) without an intervening protective film, etc. more easily in comparison, for example, to conventional polycarbonate-based, polyolefin-based, or polynorbornene-based retardation films. When a retardation film and a polarizer are laminated directly together without an intervening protective film or the like, it is desirable to dispose, on the other surface of the retardation film, a protective film which shows a negative uniaxiality (nx=ny>nz), such as a TAC film. The term "directly" means laminating a retardation film and a polarizer via no intervening constituent member such as a protective layer and it dose not mean exclusion of adhesive or pressure-sensitive adhesives.

There is no particular limitation on the method for bonding between constituent members, for example, between a retardation film and a polarizer. Conventionally known adhesives or pressure-sensitive adhesives may usually be used. The pressure-sensitive adhesive may be a transparent pressure-sensitive adhesive excellent in stress relaxation property, such as acrylic polymer, silicone-based polymer, polyester, polyurethane, polyether and synthetic rubber. Particularly, an acrylic pressure-sensitive adhesive is preferable in view of optical transparency, sticking characteristics and weather resistance.

The optical film of the present invention is required only to include the retardation film of the present invention as mentioned above. The number of constituent members included is not particularly limited. When two or more retardation films are included, these may be either the same type of retardation films or different types of retardation films.

When producing a wide viewing angle, broadband polarizing plate by combining a retardation film of the present invention and a polarizer, it is preferable to set the optical characteristics of the retardation film of the present invention as set forth below. The retardation of the retardation film is typically adjusted to ½ of a central wavelength in the case of a $\lambda/2$ plate. The central wavelength is typically set within the range of from 400 nm to 700 nm. For example, when an optical film of the present invention includes one retardation film of the present invention, it is preferable to set the Nz of the retardation film to be from 0.1 to 0.9, more preferably within the range of from 0.25 to 0.75, and even more preferably within the range of from 0.4 to 0.6. By setting like this, it is possible to realize Cross-Nicol in a very wide viewing angle range when viewing a polarizing plate of the present invention is from its front.

The polarizing plate of the present invention is preferably a circularly polarizing plate. The circularly polarizing plate can be formed, for example, by arranging a retardation film of the present invention ($\lambda/4$ plate) and a polarizer so that their optical axis angle becomes 45°.

When the retardation film used gives an exactly ¼-wavelength retardation, the circularly polarizing plate can change light transmitted into circularly polarized light. On the other hand, when a retardation film gives a retardation which is not ¼ wavelength, the circularly polarizing plate changes light transmitted not into circularly polarized light but into elliptically polarized light. Therefore, a circularly polarizing plate is demanded, as its characteristics, that it imparts circularly polarized light or elliptically polarized light close thereto in a wavelength band as wide as possible.

Moreover, in image display devices or the like, polarized light transmitted from a circularly polarized plate is reflected on a reflector which does not cancel polarized light. At this time, conversion of polarized light is achieved to a higher degree for polarized light closer to circularly polarized light. If polarized light is perfectly circularly polarized light, it is converted into circularly polarized light with a completely reversed polarity. The reflected circularly polarized light with a reversed polarity can not penetrate the circularly polarizing plate again, so that it is absorbed by the circularly polarizing plate completely. However, if the circular polarization decreases, the conversion efficiency of reflected light becomes smaller with the decrease in circular polarization. As a result, the reflected light penetrates the circularly polarizing plate more. For this reason, an item which can achieve circularly polarized light in a wider wavelength band can realize an achromatic color more.

In particular, when a circularly polarizing plate is used for preventing reflection, one which offers circularly polarized light or elliptically polarized light close thereto in the whole visible light range is a good circularly polarizing plate. However, in the case of a positive dispersion $\lambda/4$ plate, circularly polarized light is achieved only in a limited central wavelength band. In the case of a positive dispersion $\lambda/4$ plate, the circular polarity decreases and the ellipticity of the circularly polarized light becomes smaller with departure from the central wavelength. For this reason, the quantity of reflected light penetrating a circularly polarizing plate becomes zero at the central wavelength at which the retardation becomes ¼ wavelength, but it will increase with departure from the central wavelength. As a result, the circularly polarizing plate appears to be colored more with increase in the quantity of light transmitted. Such a phenomenon is observed similarly even in a flat wavelength dispersion, namely, a wavelength dispersion where the retardation does not change very much with wavelength. In this case, although coloring is reduced as compared with positive dispersion, the quantity of light transmitted becomes large in a wavelength band away from the central wavelength. Contrary to this, a circularly polarizing plate of the present invention can achieve circular polarization of transmitted light in a wider wavelength band because the circularly polarizing plate uses a retardation film of the present invention which shows reverse dispersion like that previously mentioned. For this reason, it is possible to reduce the quantity of reflected light transmitted and also reduce the transmittance of reflected light through a circularly polarizing plate even a wavelengths away from the central wavelength, thereby realizing an achromatic color.

The optical film of the present invention can be used in, for example, liquid crystal panels, liquid crystal display devices, or other image display devices. The method of their use and their arrangement are similar to those of conventional liquid crystal panels and liquid crystal display devices. In a liquid crystal panel of the present, it is desirable, for example, that an optical film of the present invention is disposed on at least one surface of a liquid crystal cell, particularly on the surface at the side of the display screen thereof. The liquid display device of the present invention is required only to have such a liquid display panel.

The display mode of the liquid crystal display device of the present invention is not particularly restricted, but IPS mode and VA mode are preferred because a high contrast can be realized in a very wide viewing angle. This is because it is possible to realize a Cross-Nicol in a wide viewing angle range and a wide wavelength band by use of an optical film of the present invention. Liquid crystal cells of VA mode show a positive uniaxiality (nx=ny<nz). It, therefore, is preferable to use an optical film including a retardation film of the present invention, a polarizer, and a protective film which shows a negative uniaxiality (nx=ny>nz). Further inclusion of such a protective film makes it possible to realize a Cross-Nicol in a wide viewing angle range and a wide wavelength band and also to compensate the liquid crystal cell. Moreover, when the retardation of a protective film is small, a film which shows a negative uniaxiality (nx=ny>nz) may be further arranged to a liquid crystal cell.

The optical film of the present invention can be used not only to liquid crystal display devices such as those described above, but also to spontaneously light-emitting type image display devices such as an organic electroluminescent (EL) display, a plasma display (PD), and a field emission display (FED). When an optical film of the present invention is used in such image display devices, a circularly polarizing plate including a retardation film of the present invention a polarizer as previously mentioned is preferred and it is preferable to arrange the circularly polarizing plate at the side of its display screen. This makes it possible to remove, for example, outer light reflected on its electrode and improve the visibility thereof even in a bright environment. There are no particular limitations except using an optical film of the present invention instead of conventional optical film. Thus, any structure or arrangement conventionally known can be applied thereto.

The following is a more detailed description of the present invention by way of examples and comparative examples, though the present invention is by no means limited to the examples below.

Example 1

Into 100 mL of pyridine was suspended 11 g of polyvinyl alcohol (PVA) having a saponification degree of 88%, and the suspension was then stirred at 100° C. under a drying condition all night. To this reaction liquid was added 100 mL of pyridine, and the resultant liquid was cooled to 50° C. Thereafter, thereto was added 8.2 g of benzoyl chloride little by little, and then the resultant was stirred at 50° C. for 6 hours. To the reaction liquid was added 800 mL of acetone, and the resultant liquid was filtrated. The resultant filtrate was mixed with 7 L of distilled water, and the resultant was re-precipitated. This precipitated polymer (white precipitation) was separated by filtration, and put into distilled water of 50° C. temperature. The polymer was stirred to be washed. The precipitated polymer collected by performing a second separation by filtration was dried under a reduced pressure to yield 7.4 g of benzoyl-modified PVA. This benzoyl-modified PVA was analyzed by $^1$H-NMR. As a result, the modification ratio of all carbon atoms in the PVA main chain based on the benzoyl groups was 13.5%.

Into 20 g of dimethylsulfoxide (DMSO) were dissolved 2 g of the resultant benzoyl-modified PVA and 0.2 g of glycerin to prepare a solution of the modified PVA. This modified PVA solution was applied onto a glass plate with an applicator, and dried to form a benzoyl-modified PVA film on the glass plate. This film was peeled from the glass plate, and drawn two times at 100° C. to produce a retardation film.

Example 2

A retardation film was produced in the same way as in Example 1 except that the amount of benzoyl chloride was changed to 13.4 g. The amount of the resultant benzoyl-modified PVA was 7.8 g, and the modification ratio of all carbon atoms in the PVA main chain based on the benzoyl groups was 19.5%.

Example 3

A retardation film was produced in the same way as in Example 1 except that the amount of benzoyl chloride was changed to 2.5 g. The amount of the resultant benzoyl-modified PVA was 7.5 g, and the modification ratio of all carbon atoms in the PVA main chain based on the benzoyl groups was 1.5%.

Example 4

Into 100 mL of pyridine was suspended 11 g of PVA having a saponification degree of 88%, and the suspension was then stirred at 100° C. under a drying condition all night. To this reaction liquid was added 100 mL of pyridine, and the resultant liquid was cooled to 50° C. Thereafter, thereto was added 4.7 g of propyol acid little by little, and then the resultant was stirred at 50° C. for 6 hours. To the reaction liquid was added 800 mL of acetone, and the resultant liquid was filtrated. The resultant filtrate was mixed with 7 L of distilled water, and the resultant was re-precipitated. This precipitated polymer (white precipitation) was separated by filtration, and put into distilled water of 50° C. temperature. The polymer was stirred to be washed. The precipitated polymer collected by performing a second separation by filtration was dried under a reduced pressure to yield 6.7 g of propioloyl-modified PVA. This propioloyl-modified PVA was analyzed by $^1$H-NMR. As a result, the modification ratio of all carbon atoms in the PVA main chain based on the propioloyl groups was 15%.

Into 20 g of DMSO were dissolved 2 g of the resultant propioloyl-modified PVA and 0.2 g of glycerin to prepare a solution of the propioloyl-modified PVA. This solution was applied onto a glass plate with an applicator, and dried to form a propioloyl-modified PVA film on the glass plate. This film was peeled from the glass plate, and drawn two times at 100° C. to produce a retardation film.

Example 5

A retardation film was produced in the same way as in Example 4 except that the amount of propiolic acid was changed to 6 g. The amount of the resultant propioloyl-modified PVA was 7.2 g, and the modification ratio of all carbon atoms in the PVA main chain based on the propioloyl groups was 18%.

Example 6

A retardation film was produced in the same way as in Example 4 except that the amount of propiolic acid was changed to 2 g. The amount of the resultant propioloyl-modified PVA was 6.4 g, and the modification ratio of all carbon atoms in the PVA main chain based on the propioloyl groups was 2.5%.

Example 7

A benzoyl-modified PVA film (undrawn) was produced in the same way as in Example 1, and biaxially drawn polyolefin films were stuck onto both surfaces of this film with a pressure-sensitive adhesive. This laminate was drawn two times at 100° C., and then the polyolefin films were peeled to yield a drawn, benzoyl-modified PVA film. This was used as a retardation film.

Example 8

The retardation film of Example 7 above was stuck to one surface of a PVA iodine-based polarizer using a PVA-based adhesive. The retardation film and the polarizer were arranged so that the slow axis of the retardation film and the absorption axis of the polarizer were parallel to each other. Moreover, a TAC film (a protective film, hereinafter the same) was stuck on the surface of another side of the polarizer to produce a polarizing plate.

Comparative Example 1

Into 20 g of methylene chloride was dissolved 2 g of polycarbonate. This solution was applied onto a glass plate with an applicator, and dried to form a polycarbonate film on the glass plate. This film was drawn 1.5 times at 160° C. to produce a retardation film.

Comparative Example 2

A non-modified PVA film was prepared in the same way as in Example 1 except that benzoyl chloride was not added. This was drawn to produce a retardation film.

The property of each of the retardation films of Examples 1 to 7 and the retardation films of Comparative Examples 1 to 2 yielded as described above was evaluated. A relationship between refractive indexes of each of the resultant retardation films is as follows.

Example 1 nx>ny≈nz

Example 2 nx>ny≈nz

Example 3 nx>ny≈nz

Example 4 nx>ny≈nz

Example 5 nx>ny≈nz

Example 6 nx>ny≈nz

Example 7 nx>nz>ny

Comparative Example 1 nx>ny≈nz

Comparative Example 2 nx>ny≈nz (Wavelength dispersion property)

Figure 1:
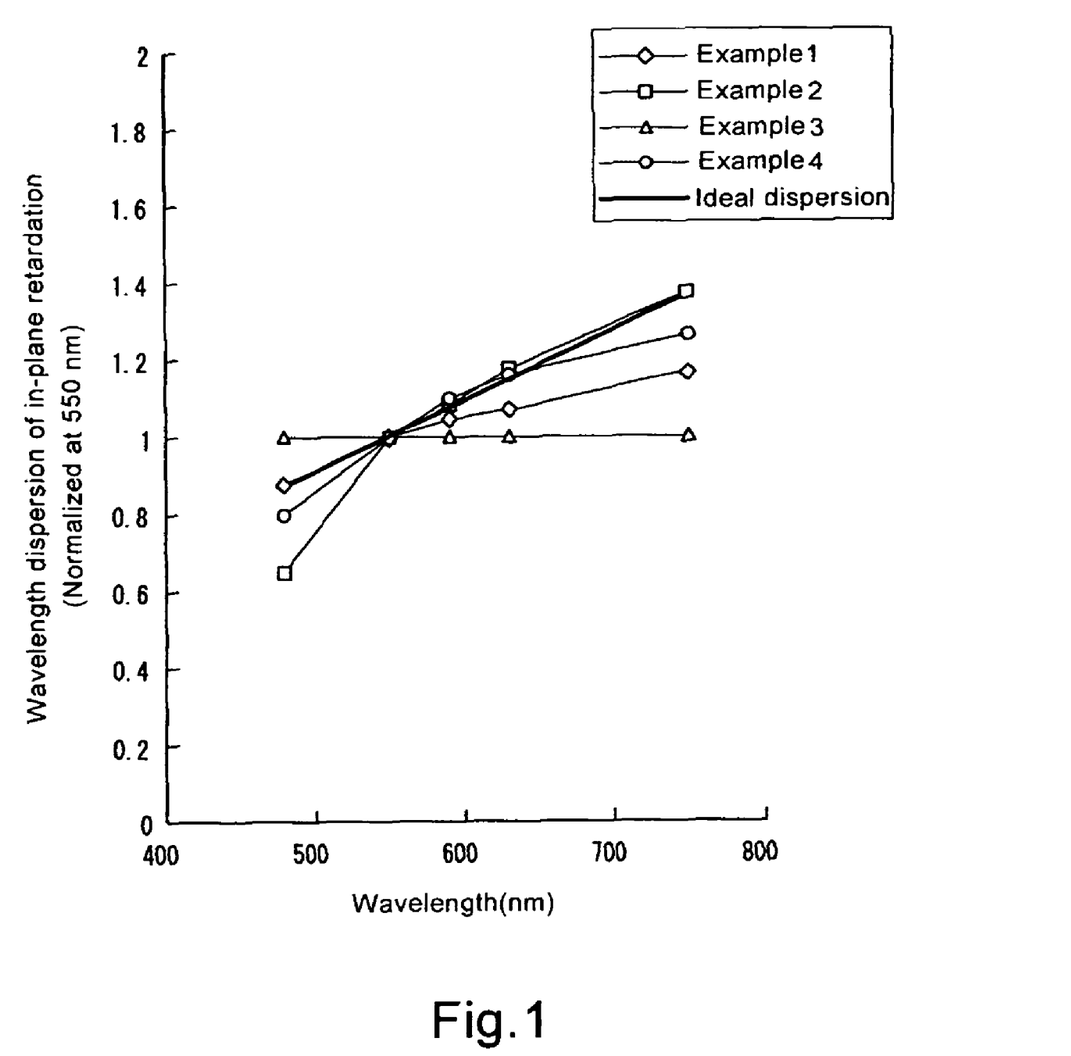
FIG. 1 is a graph showing wavelength dispersions of retardation films of Examples 1 to 4.
Figure 2:
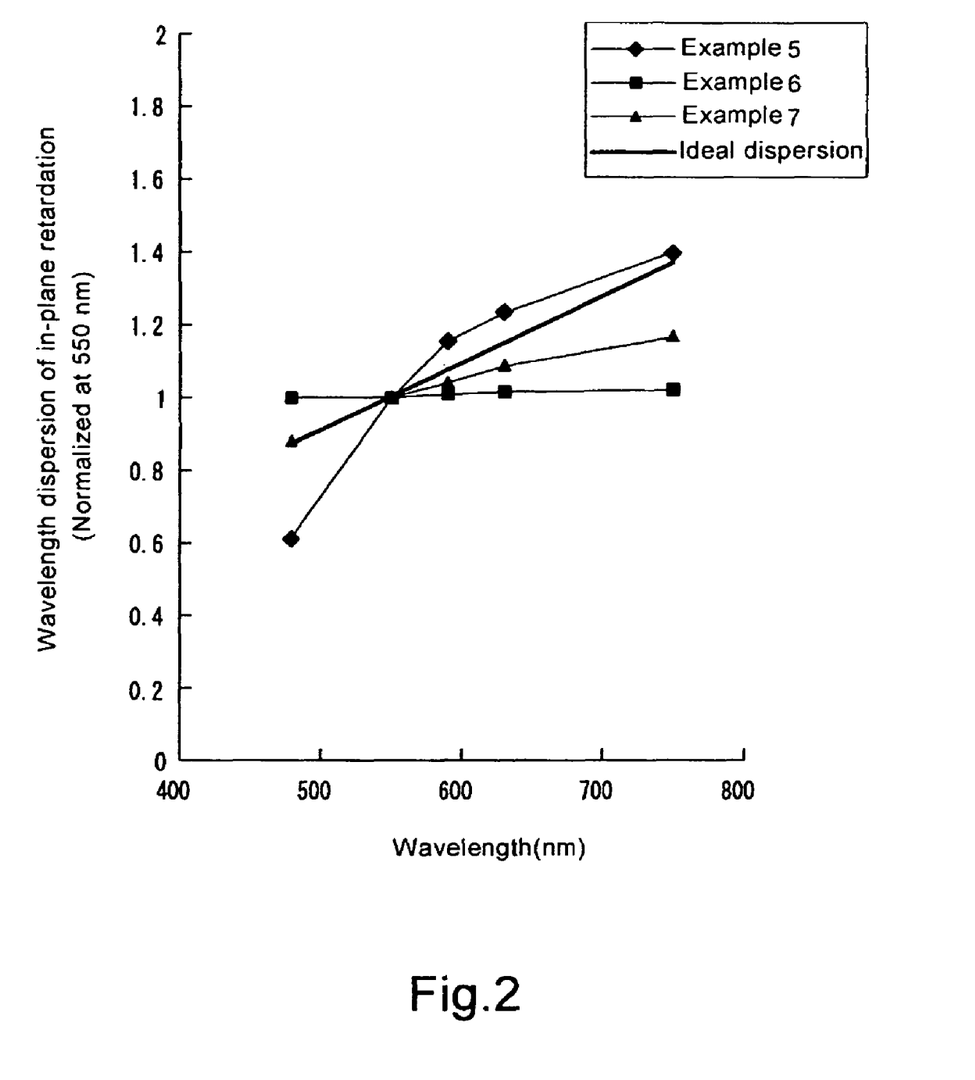
FIG. 2 is a graph showing wavelength dispersions of retardation films of Examples 5 to 7.
Figure 3:
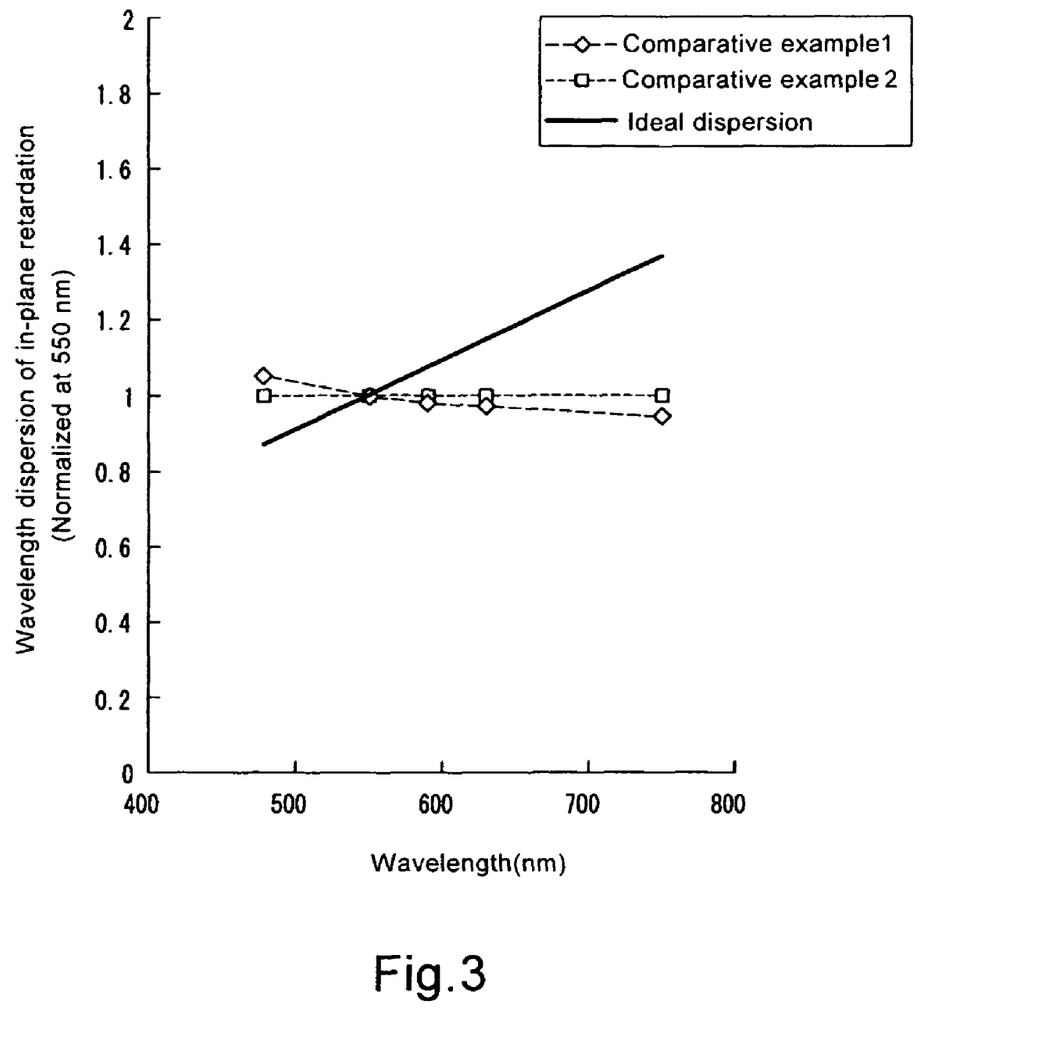
FIG. 3 is a graph showing wavelength dispersions of retardation films of Comparative Examples 1 to 2.

A birefringence measuring device (trade name: KOBRA-21ADH, manufactured by Oji Scientific Instruments) was used to measure the wavelength dispersion of the in-plane retardation in individual retardation films. The results are shown in Table 1 and graphs shown in FIGS. 1 to 3. In each of the figures, the transverse axis represents wavelength, and the vertical axis represents the wavelength dispersion of the in-plane retardation Δnd(X nm)/Δnd(550 nm). FIG. 1, FIG. 2 and FIG. 3 show the results of Examples 1 to 4, the results of Examples 5 to 7, and the results of Comparative Examples 1 and 2, respectively. In each of the graphs, an ideal reverse dispersion (ideal dispersion) is shown.

TABLE 1

| | Δnd(X nm)/Δnm(550 nm) X nm | | | | |
|---|---|---|---|---|---|
| | 480 | 550 | 590 | 630 | 750 |
| Example 1 | 0.879009 | 1 | 1.048834 | 1.059038 | 1.161808 |
| Example 2 | 0.651393 | 1 | 1.082991 | 1.175886 | 1.371372 |
| Example 3 | 0.998947 | 1 | 1.000239 | 1.000397 | 1.001863 |
| Example 4 | 0.801641 | 1 | 1.092031 | 1.155008 | 1.260089 |
| Example 5 | 0.617707 | 1 | 1.15948 | 1.240177 | 1.389654 |
| Example 6 | 0.991441 | 1 | 1.005588 | 1.010172 | 1.015612 |
| Example 7 | 0.885 | 1 | 1.045 | 1.080504 | 1.161 |
| Comparative Example 1 | 1.0505 | 1 | 0.98 | 0.968 | 0.944 |
| Comparative Example 2 | 1.007353 | 1 | 0.99682 | 0.944138 | 0.99066 |
| Ideal dispersion | 0.872727 | 1 | 1.072727 | 1.145455 | 1.363636 |

As shown in FIGS. 1 and 2, the retardation films of Examples 1 to 7 each exhibited a reverse dispersion that the in-plane retardation was larger from short wavelengths toward longer wavelengths. On the other hand, as illustrated in FIG. 3, the retardation film of Comparative Example 1 exhibited a positive dispersion and the retardation film of Comparative Example 2 exhibited a substantially flat wavelength dispersion, which was not any reverse dispersion.

(Circular Polarity)

Each of the retardation film was stuck to a polarizing plate (trade name: SEG1425DU: manufactured by NITTO DENKO CORP.) to produce a circularly polarizing plate. The retardation film and the polarizer were arranged so that the absorption axis of the retardation film and the slow axis of the polarizing plate produced an angle of 45°. The circularly polarizing plate was arranged on a surface of a reflecting plate wherein aluminum had been evaporated on PET (an aluminum-evaporated film surface), and a color reflected thereon was evaluated with a device (trade name: MCPD 3000, manufactured by Otsuka Electronics). These test results (a* value, b* value) are shown in Table 2 below. When an absolute value of a* is larger, the color is judged to be more reddish, whereas when an absolute value of b* is larger, the color is judged to be more yellowish.

TABLE 2

|  | a* | b* |
| --- | --- | --- |
| Example 1 | 14.076 | 8.962 |
| Example 4 | 21.811 | −15.170 |
| Comparative Example 1 | 46.783 | −34.852 |
| Comparative Example 2 | 42.656 | −31.364 |

Table 2 above shows that both the absolute values of a* and b* are smaller in the cases of using the retardation films of Examples 1 and 4 in comparison to Comparative Examples 1 and 2. This results in a judgment that Examples 1 and 4 are closer to an anchromic color and less colored. For this reason, according to the retardation films of the Examples, a circular polarity can be achieved in a wider wavelength band in comparison to the Comparative Examples.

(Retardation Change)

Next, about the retardation film of Example 7, the retardation change thereof was checked.

About the retardation film of Example 7, the front face retardation and the retardation in the state that the retardation film was inclined at an angle of 400 to the slow axis were measured, and the retardation change was checked. As a result, the retardation film of Example 7 hardly gave any retardation change. The Nz coefficient was about 0.55 from the calculation thereof based on extrapolation (the calculation thereof from the measured birefringence index).

(Observation of Transmitted Light)

The polarizing plate of Example 8 and a linearly polarizing plate composed of a PVA iodine-based polarizer having, on its one surface, a protective film (TAC film) were arranged so that their absorption axes intersected at right angles, and the light transmitted was observed. The linearly polarizing plate was disposed so that the protective film was located on the other side of the polarizing plate of Example 8. Then, transmitted light was observed while the polarizing plate of Example 8 and the linearly polarizing plate were arranged so that their absorption axes formed angles of 45° and −45°, respectively, with respect to the 0° direction on a plane and were inclined at 450 from the normal toward the 0° direction on the plane. As a result, almost no light leakage occurred and the result was almost the same as that obtained in the observation from the normal direction (inclination angle 0°). When the linearly polarizing plate was rotated, the quantity of light transmitted increased. This fact shows that inclination of the polarizing plate of Example 8 caused almost no change in the angles of the absorption axes. On the other hand, polarizing plates were prepared in the same way as Example 8 except using the retardation films of Comparative Example 1 and Comparative Example 2, followed by similar observation. As a result, in the polarizing plates using the retardation films of Comparative Examples 1 and 2, light came to leak as the inclination angle increased and the quantity of light transmitted decreased gradually when the linearly polarizing plates combined were rotated. It seems, from this fact, that in the polarizing plates using the retardation films of Comparative Examples 1 and 2, angles of their absorption axes changed.

INDUSTRIAL APPLICABILITY

As described above, according to the present invention, it is possible to obtain easily a modified polymer which exhibits reverse dispersion without conventional choice of a plurality of monomers or polymers. In addition, use of this modified polymer of the present invention makes it possible to produce a reverse dispersion retardation film while avoiding problems, such as a glass transition temperature in drawing treatment, conventionally arisen. Therefore, the modified polymer of the present invention is very useful as a novel raw material for retardation films which show reverse dispersion.

The invention claimed is:

1. A liquid crystal panel comprising a retardation film comprising a modified polymer;

wherein the modified polymer has, as a main chain thereof, a polyvinyl alcohol skeleton or a polyethylene vinyl alcohol skeleton, and has a portion where at least one chemical group selected from a group consisting of an aromatic carbonyl group represented by the following formula (1) or (2), an aryl-substituted lower alkylcarbonyl group represented by Ar—$(CH_2)_n$—CO— (Ar is an aromatic ring and n is an integer of 1 to 2), and an unsaturated aliphatic carbonyl group represented by any one of the following formulae (5) to (7), is bonded to an oxygen atom in a side chain of the skeleton, wherein in formula (1), $R^1$, $R^2$, $R^3$, $R^4$ and $R^5$ may be the same or different, and each represents a hydrogen atom or halogen atom, or a hydroxyl, methyl, ethyl, halogenated methyl, halogenated ethyl or nitro (—$NO_2$) group; in formula (2), $R^6$, $R^7$, $R^8$, $R^9$, $R^{10}$, $R^{11}$ and $R^{12}$ may be the same or different, and each represents a hydrogen atom or halogen atom, or a hydroxyl, methyl, ethyl, halogenated methyl, halogenated ethyl or nitro (—$NO_2$) group, -continued (7)

wherein in formulae (5) to (7), each of $R^{13}$, $R^{14}$ and $R^{15}$ is a hydrogen atom or halogen atom, or a hydroxyl, methyl, ethyl, halogenated methyl, halogenated ethyl or nitro ($-NO_2$) group.

2. A liquid crystal display device comprising the liquid crystal panel according to claim 1.

3. A liquid crystal panel, comprising a retardation film comprising a modified polymer:

the retardation film is disposed on at least one surface of a liquid crystal cell, wherein the modified polymer has, as a main chain thereof, a polyvinyl alcohol skeleton or a polyethylene vinyl alcohol skeleton, and has a portion where at least one chemical group selected from a group consisting of an aromatic carbonyl group represented by the following formula (1) or (2), an aryl-substituted lower alkylcarbonyl group represented by Ar—$(CH_2)_n$—CO— (Ar is an aromatic ring and n is an integer of 1 to 2), and an unsaturated aliphatic carbonyl group represented by any one of the following formulae (5) to (7), is bonded to an oxygen atom in a side chain of the skeleton, (1)

(2)

wherein in formula (1), $R^1$, $R^2$, $R^3$, $R^4$ and $R^5$ may be the same or different, and each represents a hydrogen atom or halogen atom, or a hydroxyl, methyl, ethyl, halogenated methyl, halogenated ethyl or nitro ($-NO_2$) group; in formula (2), $R^6$, $R^7$, $R^8$, $R^9$, $R^{10}$, $R^{11}$ and $R^{12}$ may be the same or different, and each represents a hydrogen atom or halogen atom, or a hydroxyl, methyl, ethyl, halogenated methyl, halogenated ethyl or nitro ($-NO_2$) group, (5)

(6)

-continued (7)

wherein in formulae (5) to (7), each of $R^{13}$, $R^{14}$ and $R^{15}$ is a hydrogen atom or halogen atom, or a hydroxyl, methyl, ethyl, halogenated methyl, halogenated ethyl or nitro ($-NO_2$) group.

4. The liquid crystal panel according to claim 3, wherein the retardation film is disposed on a display screen side of the liquid crystal cell.

5. A liquid crystal display device comprising the liquid crystal panel according to claim 3.

6. An image display device comprising a retardation film comprising a modified polymer:

wherein the modified polymer has, as a main chain thereof, a polyvinyl alcohol skeleton or a polyethylene vinyl alcohol skeleton, and has a portion where at least one chemical group selected from a group consisting of an aromatic carbonyl group represented by the following formula (1) or (2), an aryl-substituted lower alkylcarbonyl group represented by Ar—$(CH_2)_n$—CO— (Ar is an aromatic ring and n is an integer of 1 to 2), and an unsaturated aliphatic carbonyl group represented by any one of the following formulae (5) to (7), is bonded to an oxygen atom in a side chain of the skeleton, (1)

(2)

wherein in formula (1), $R^1$, $R^2$, $R^3$, $R^4$ and $R^5$ may be the same or different, and each represents a hydrogen atom or halogen atom, or a hydroxyl, methyl, ethyl, halogenated methyl, halogenated ethyl or nitro ($-NO_2$) group; in formula (2), $R^6$, $R^7$, $R^8$, $R^9$, $R^{10}$, $R^{11}$ and $R^{12}$ may be the same or different, and each represents a hydrogen atom or halogen atom, or a hydroxyl, methyl, ethyl, halogenated methyl, halogenated ethyl or nitro ($-NO_2$)) group, (5)

(6)

-continued (7)

wherein in formulae (5) to (7), each of $R^{13}$, $R^{14}$ and $R^{15}$ is a hydrogen atom or halogen atom, or a hydroxyl, methyl, ethyl, halogenated methyl, halogenated ethyl or nitro ($-NO_2$) group.

7. The image display device according to claim 6, wherein the image display device is at least one member selected from a group consisting of an organic electroluminescent (EL) display, a plasma display (PD), and an FED (a field emission display).

* * * * *